United States Patent
Khay-Ibbat et al.

(10) Patent No.: US 9,526,037 B2
(45) Date of Patent: Dec. 20, 2016

(54) SRVCC HANDOVER INDICATION FOR REMOTE PARTY TO VOICE CALL

(71) Applicant: Apple Inc., Cupertino, CA (US)

(72) Inventors: Samy Khay-Ibbat, San Francisco, CA (US); Sarma V. Vangala, San Jose, CA (US); Sreevalsan Vallath, Dublin, CA (US); Navid Damji, Cupertino, CA (US); Luciano Miguel Verger, San Jose, CA (US); Srinivasan Vasudevan, Sunnyvale, CA (US); Shivesh Makharia, Santa Clara, CA (US); Sree Ram Kodali, Sunnyvale, CA (US); Madhusudan Chaudhary, Sunnyvale, CA (US); Jianxiong Shi, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 107 days.

(21) Appl. No.: 14/168,402

(22) Filed: Jan. 30, 2014

(65) Prior Publication Data

US 2014/0219246 A1    Aug. 7, 2014

Related U.S. Application Data

(60) Provisional application No. 61/760,579, filed on Feb. 4, 2013.

(51) Int. Cl.
*H04W 36/00* (2009.01)
*H04L 1/20* (2006.01)
(Continued)

(52) U.S. Cl.
CPC ..... *H04W 36/0022* (2013.01); *H04W 36/0066* (2013.01); *H04J 3/0632* (2013.01);
(Continued)

(58) Field of Classification Search
CPC ........... H04W 36/0022; H04W 36/023; H04W 72/1236; H04W 72/0406; H04W 76/041; H04W 72/04; H04W 28/0268; H04W 36/00; H04W 36/0044; H04W 36/0066; H04L 65/1033
See application file for complete search history.

(56) References Cited

U.S. PATENT DOCUMENTS

| 7,817,677 B2* | 10/2010 | Black ................... G10L 19/005 370/516 |
| 2009/0268707 A1* | 10/2009 | Pani et al. .................... 370/345 |

(Continued)

FOREIGN PATENT DOCUMENTS

| WO | 2011014992 A1 | 2/2011 |
| WO | 2011152102 A1 | 12/2012 |

OTHER PUBLICATIONS

Huawei Successfully Completes the First VoLTE Call with eSRVCC Handover (Aug. 28, 2012), pr.huawei.com. Retrieved from http://pr.huawei.com/en/news/hw-187569-volteesrvcc.htm#.Uf_0NBYQLGs.

(Continued)

*Primary Examiner* — Jae Y Lee
*Assistant Examiner* — Aixa Guadalupe-Cruz
(74) *Attorney, Agent, or Firm* — Downey Brand LLP

(57) ABSTRACT

A method for providing indication of an SRVCC handover is disclosed. The method can include a first wireless communication device participating in a voice call with a second wireless communication device via a connection between the first wireless communication device and a first network. The method can further include the first wireless communication device determining a condition indicative of an impending SRVCC handover of the first wireless communication device from the first network to a legacy network. In response to the condition, the method can additionally include the first wireless communication device formatting (Continued)

a message including an indication that the first wireless communication device is going to perform the SRVCC handover and sending the message to the second wireless communication device prior to performance of the SRVCC handover.

20 Claims, 5 Drawing Sheets

(51) Int. Cl.
*H04L 29/06* (2006.01)
*H04J 3/06* (2006.01)
*H04W 76/04* (2009.01)

(52) U.S. Cl.
CPC ........ *H04L 1/205* (2013.01); *H04L 29/06027* (2013.01); *H04L 29/06176* (2013.01); *H04L 65/102* (2013.01); *H04W 76/041* (2013.01)

(56) References Cited

U.S. PATENT DOCUMENTS

| | | | |
|---|---|---|---|
| 2010/0208670 A1* | 8/2010 | Zisimopoulos ... | H04W 36/0022 370/329 |
| 2012/0307800 A1* | 12/2012 | Wong et al. ................. | 370/331 |
| 2013/0094472 A1* | 4/2013 | Klingenbrunn et al. ..... | 370/331 |
| 2013/0142168 A1* | 6/2013 | Vedrine ............ | H04W 36/0022 370/331 |
| 2013/0188603 A1* | 7/2013 | Nishida ................. | H04W 40/36 370/331 |

OTHER PUBLICATIONS

3GPP TR 23.856, Single Radio Voice Call Continuity (SRVCC) enhancements; Stage 2 (Sep. 2010).

* cited by examiner

SRVCC HANDOVER INDICATION FOR REMOTE PARTY TO VOICE CALL

CROSS-REFERENCE TO RELATED APPLICATION

This application claims the benefit of priority from U.S. Provisional Patent Application No. 61/760,579, filed on Feb. 4, 2013, which is hereby incorporated herein by reference in its entity.

FIELD

The described embodiments relate generally to wireless communications technology. More particularly, the present embodiments relate to provision of an indication that a first device participating in a voice call is going to perform a single radio voice call continuity (SRVCC) handover to a second device participating in the voice call.

BACKGROUND

Cellular networks using newer radio access technologies (RATs), such as Long Term Evolution (LTE), are being developed and deployed. Networks using these newer RATs have packet switched (PS) domains configured to support PS voice calls, such as via voice over Internet Protocol (VoIP). As coverage of newer networks such as LTE networks is not universal, networks using newer RATs are often co-deployed with legacy RATs, such as second generation (2G) and third generation (3G) RATs, including Universal Mobile Telecommunications System (UMTS) networks and Global System for Mobile Communications (GSM) networks, which only support voice calls via a circuit switched (CS) domain. Accordingly, a wireless communication device can be handed over between a network, such as an LTE network, supporting PS voice calls and a legacy network supporting voice calls via a CS domain as coverage or other conditions may dictate. For example, where LTE coverage is running out, the LTE network can redirect a device to a legacy network in response to the device moving out of the coverage range of the LTE network.

A device having an active voice call supported by a PS domain of an LTE network or other network supporting PS voice calls may have to perform a handover to a legacy network during the voice call due to mobility outside of a coverage area of the serving network or other network conditions, which may merit handover. SRVCC has been defined as a procedure to allow an active voice call to be moved from a PS domain to a CS domain of a legacy network during handover of a device to a legacy network. Presently, only the device redirected to the legacy network is aware of occurrence of the SRVCC handover. As such, a device participating in the voice call can be unaware that a remote device participating in the voice call is participating in an SRVCC procedure. SRVCC is a relatively complicated and time consuming procedure on the network side. Due to the complexity of SRVCC, a device participating in a voice call via voice over LTE (VoLTE) or other VoIP connection while a remote device is performing an SRVCC handover can experience an interruption of voice packets in both uplink (UL) and downlink (DL) directions for up to 300 milliseconds, which can negatively impact user experience.

SUMMARY

Some example embodiments provide advance notification of a remote SRVCC handover to a device participating in a voice call. More particularly, in accordance with some such example embodiments, a first device participating in a voice call can be configured to determine a condition indicative of an impending SRVCC handover and, in response thereto, can inform a second device participating in the voice call of the impending SRVCC handover prior to performance of the SRVCC handover. The second device of such example embodiments can be configured to prepare for the remote SRVCC handover by adapting the de-jitter buffer to provide for better user experience during any interruption in transfer of voice packets during the remote SRVCC procedure. Accordingly, user experience can be improved through better audio continuity during the remote SRVCC handover.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Some example embodiments provide advance notification of a remote SRVCC handover to a device participating in a voice call. More particularly, in accordance with some example embodiments, a first device participating in a voice call can be configured to determine a condition indicative of an impending SRVCC handover and, in response thereto, can send a message comprising an indication of the impending SRVCC handover to a second device participating in the voice call prior to performance of the SRVCC handover. The second device of such example embodiments can receive the message and can be configured to respond to the indication by adapting the de-jitter buffer in preparation for the remote SRVCC handover. For example, in accordance with some embodiments, the second device can modify a configuration parameter of the de-jitter buffer to provide better audio continuity during any interruption in transfer of voice packets that may occur during the SRVCC procedure. In this regard, the advance notice of the remote SRVCC procedure provided by some example embodiments can enable the second device to prepare for the SRVCC handover, thereby improving user experience through better audio continuity during the remote SRVCC handover.

These and other embodiments are discussed below with reference to FIGS. 1-5. However, those skilled in the art will readily appreciate that the detailed description given herein with respect to these Figures is for explanatory purposes only and should not be construed as limiting.

Figure 1:
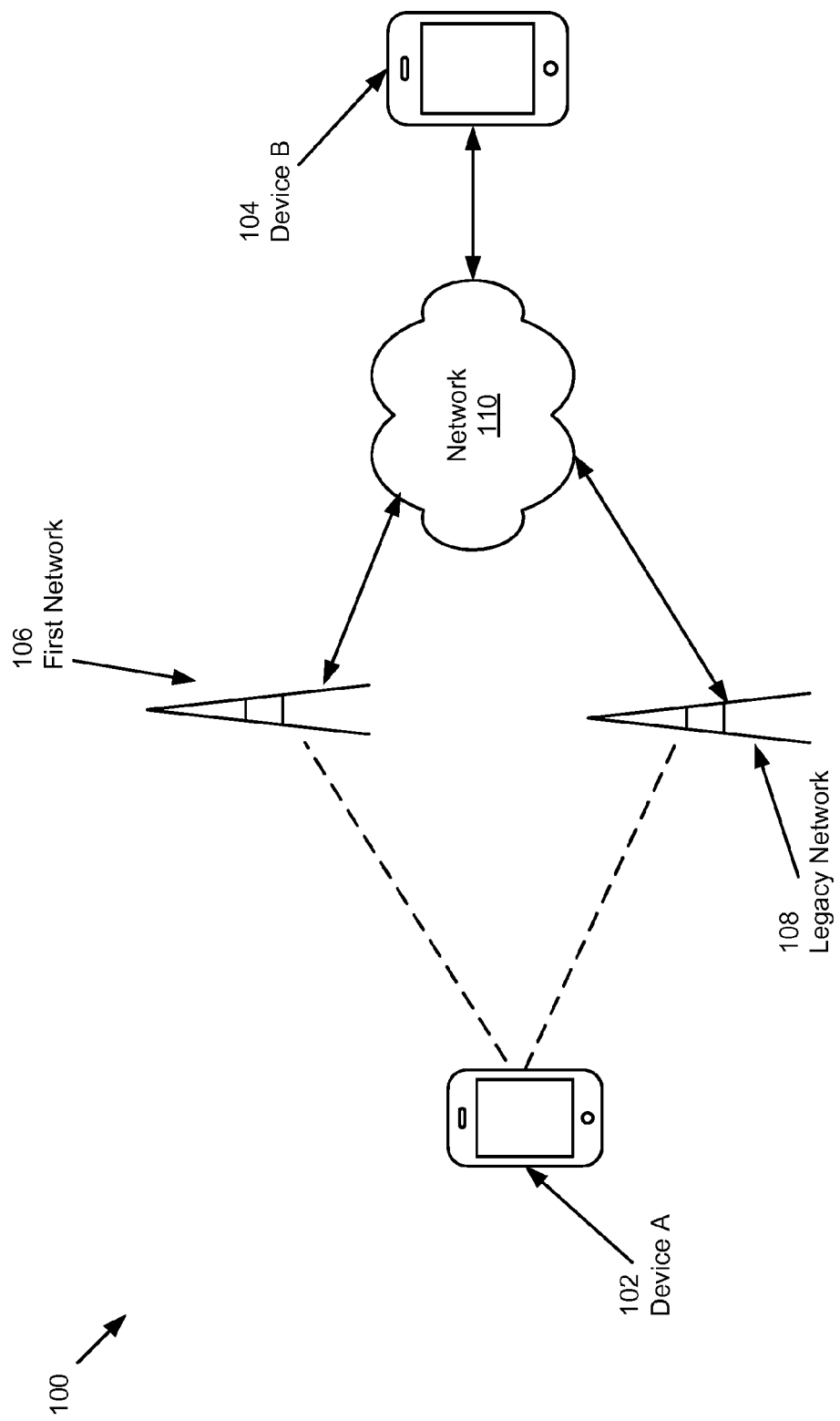
FIG. 1 illustrates an example wireless communication system in accordance with some example embodiments.

FIG. 1 illustrates an example wireless communication system in accordance with some example embodiments. The system 100 can include Device A 102 and Device B 104. Device A 102 can be embodied as a wireless communication device. By way of non-limiting example, Device A 102 can be embodied as a cellular phone, such as a smart phone device, a tablet computing device, a laptop computing device, and/or other computing device that can be configured (e.g., via hardware and/or software) to wirelessly access a network and engage in a voice call.

In some example embodiments, Device B 104 can also be embodied as a wireless communication device. For example, Device B 104 can be embodied as a cellular phone, such as a smart phone device, a tablet computing device, a laptop computing device, and/or other computing device that can be configured (e.g., via hardware and/or software) to wirelessly access a network and engage in a voice call. It will be appreciated, however, that in some example embodiments, Device B 104 can be embodied as a computing device configured to access a network via a wireline connection to enable participation in a voice call with the device A 102. For example, in some such embodiments in which Device B 104 is configured to access a network via a wireline connection, Device B 104 can be embodied as a computing device, such as a desktop computing device, laptop computing device, or other computing device, that can access (e.g., via the Internet) and/or execute an application supporting VoIP calls to enable the computing device to support a voice call with Device A 102. As such, it will be appreciated that techniques described herein with respect to embodiments in which Device B 104 is embodied as a wireless communication device can be applied mutatis mutandis to embodiments in which Device B 104 is connected to an access network and participating in a voice call via a wireline connection.

Device B 104 can be connected to a network 110 (e.g., via an access network), which can be configured to facilitate communication between Device B 104 and Device A 102. In this regard, the network 110 can be embodied as any network or combination of networks that can enable communication between Device B 104 and a cellular radio access network, such as the first network 106 and legacy network 108, which can be accessed via Device A 102 so as to support a voice call between Device A 102 and Device B 104. For example, the network 110 can comprise one or more cellular core networks, one or more wireline networks, one or more wireless networks (e.g., one or more cellular networks, one or more wireless local area networks, one or more wireless metropolitan area networks, one or more wireless wide area networks, some combination thereof, or the like), or some combination thereof, and in some example embodiments can comprise the Internet.

In some embodiments, Device B 104 can be connected to network 110 via a wireless access network, such as a cellular network, wireless local area network (WLAN), wireless metropolitan area network, and/or other wireless access network. In embodiments in which Device B 104 is connected to the network 110 a cellular network, the cellular network can use any present or future developed cellular RAT supporting PS voice communication. For example, Device B 104 can be connected to a cellular network implementing an LTE technology, such as LTE, LTE-Advanced (LTE-A), and/or other present or future developed LTE RAT; various fifth generation (5G) RATs presently in development; and/or other present or future developed cellular RAT supporting PS voice communication. Additionally or alternatively, in some embodiments, Device B 104 can be connected to the network 110 via a wireline connection.

Device A 102 and Device B 104 can be engaged in an active voice call. The voice call can be initiated by either of Device A 102 or Device B 104. In some example embodiments, both Device A 102 and Device B 104 can be engaged in the voice call via PS connections. Thus, for example, in some embodiments, both Device A 102 and Device B 104 can be engaged in a voice call supported by a VoIP connection, such as a VoLTE voice call. In instances in which both Device A 102 and Device B 104 are connected to a cellular network(s) implementing an LTE RAT, the voice call can be an end-to-end VoLTE call.

Device A 102 can be served by the first network 106 prior to undergoing an SRVCC handover. The first network 106 can be a network having a PS domain capable of supporting voice calls. As such, when Device A 102 is engaged in a voice call while on the first network 106, the voice call can be serviced (e.g., as a VoLTE or other VoIP call) via a PS domain of the first network 106. In some example embodiments, the first network 106 can be a network using an LTE technology, such as an LTE network, an LTE-Advanced (LTE-A) network, and/or other present or future developed LTE network. It will be appreciated, however, that first network 106 can be any network using a present or future developed RAT that can service voice calls via a PS domain, including, for example, various 5G cellular RATs presently in development.

Device A 102 can encounter conditions which can result in Device A 102 performing a handover to the legacy network 108 while the voice call is ongoing. For example, Device A 102 can exit a coverage area of the first network 106 due to device mobility, and can be redirected to the legacy network 108. Handover of Device A 102 from the first network 106 to the legacy network 108 while engaged in an active voice call with Device B 104 can be facilitated via an SRVCC procedure to provide for continuity of the voice call on a CS domain of the legacy network 108.

The legacy network 108 can be any network comprising a CS domain, which is configured to service voice calls as CS calls via the CS domain. By way of non-limiting example, the legacy network 108 can be a third generation (3G) network, such as a Wideband Code Division Multiple Access (WCDMA) network, a Time Division Synchronous Code Division Multiple Access (TD-SCDMA) network, or other Universal Mobile Telecommunications System (UMTS) network; a CDMA 2000 network or other network standardized by the Third Generation Partnership Project 2 (3GPP2) that supports voice calls via a CS domain; and/or other 3G network. As another example, the legacy network 108 can be a second generation (2G) network such as a Global System for Mobile Communications (GSM) network.

In accordance with some example embodiments as described further herein, Device A 102 can be configured to determine when there is a likelihood that it will perform an SRVCC handover from the first network 106 to the legacy network 108. In this regard, Device A 102 can be configured to determine existence of a condition indicative of an impending SRVCC handover to the legacy network 108. In an instance in which Device A 102 determines that there is a likelihood that it will perform an SRVCC handover (e.g., that there is a condition indicative of an impending SRVCC handover to the legacy network 108), Device A 102 can provide an advance indication to Device B 104 that Device A 102 is going to perform an SRVCC handover. Device B 104 can, in turn, receive the indication and, in accordance with some example embodiments, can modify a configuration parameter of its de-jitter buffer in advance of the SRVCC handover to improve audio continuity and provide a better user experience during an interruption in the transfer of voice packets that can occur during the SRVCC handover.

Figure 2:
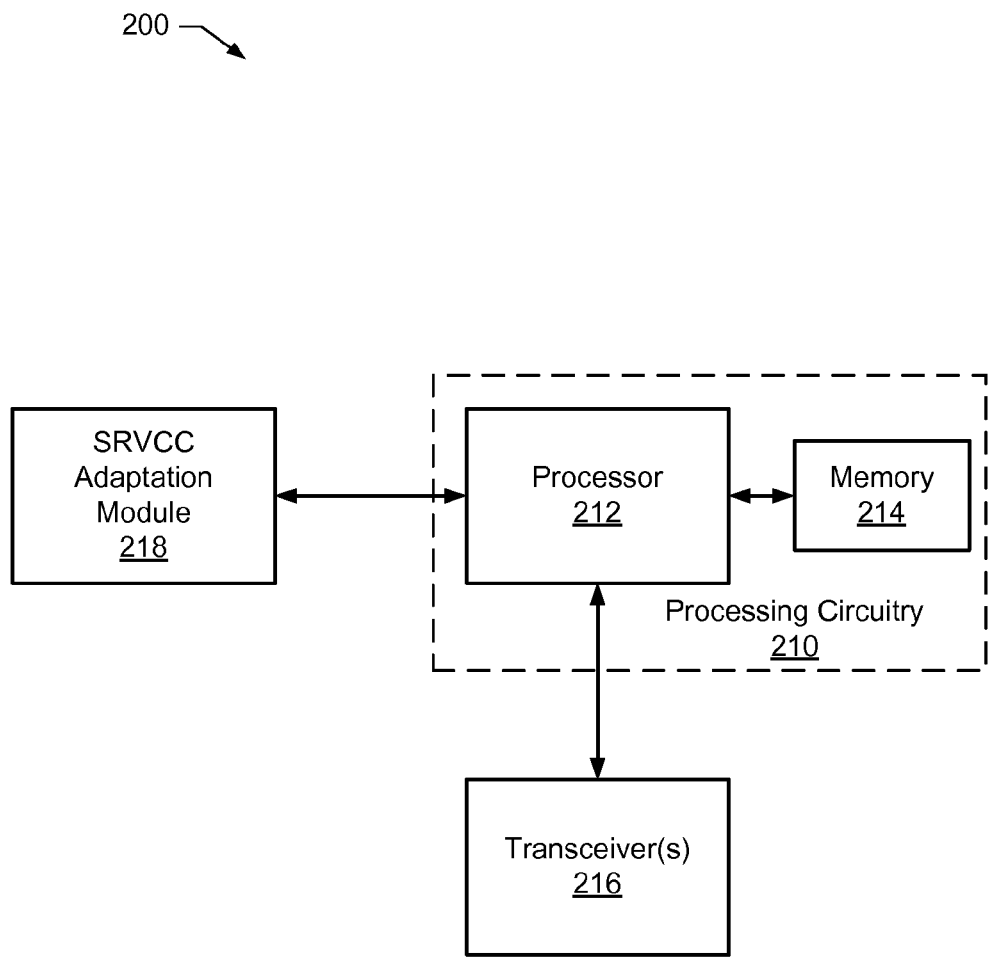
FIG. 2 illustrates a block diagram of an apparatus that can be implemented on a wireless communication device in accordance with some example embodiments.

FIG. 2 illustrates a block diagram of an apparatus 200 that can be implemented on a communication device, such as Device A 102 and/or Device B 104, in accordance with some example embodiments. In this regard, when implemented on a computing device, apparatus 200 can enable the computing device to operate within the system 100 in accordance with one or more example embodiments. It will be appreciated that the components, devices or elements illustrated in and described with respect to FIG. 2 below may not be mandatory and thus some may be omitted in certain embodiments. Additionally, some embodiments can include further or different components, devices or elements beyond those illustrated in and described with respect to FIG. 2.

In some example embodiments, the apparatus 200 can include processing circuitry 210 that is configurable to perform actions in accordance with one or more example embodiments disclosed herein. In this regard, the processing circuitry 210 can be configured to perform and/or control performance of one or more functionalities of the apparatus 200 in accordance with various example embodiments, and thus can provide means for performing functionalities of the Device A 102 and/or Device B 104 in accordance with various example embodiments. The processing circuitry 210 can be configured to perform data processing, application execution and/or other processing and management services according to one or more example embodiments.

In some embodiments, the apparatus 200 or a portion(s) or component(s) thereof, such as the processing circuitry 210, can include one or more chipsets, which can each include one or more chips. The processing circuitry 210 and/or one or more further components of the apparatus 200 can therefore, in some instances, be configured to implement an embodiment on a single chip or chipset. In some example embodiments in which one or more components of the apparatus 200 are embodied as a chipset, the chipset can be capable of enabling a computing device to operate in the system 100 when implemented on or otherwise operably coupled to the computing device. Thus, for example, one or more components of the apparatus 200 can provide a chipset, such as a cellular baseband chipset, configured to enable a computing device to operate over one or more cellular networks, such as the first network 106 and/or the legacy network 108.

In some example embodiments, the processing circuitry 210 can include a processor 212 and, in some embodiments, such as that illustrated in FIG. 2, can further include memory 214. The processing circuitry 210 can be in communication with or otherwise control transceiver(s) 216 and/or SRVCC adaptation module 218.

The processor 212 can be embodied in a variety of forms. For example, the processor 212 can be embodied as various hardware-based processing means, such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 212 can comprise a plurality of processors. The plurality of processors can be in operative communication with each other and can be collectively configured to perform one or more functionalities of a wireless communication device as described herein. In some example embodiments, the processor 212 can be configured to execute instructions that can be stored in the memory 214 or that can be otherwise accessible to the processor 212. As such, whether configured by hardware or by a combination of hardware and software, the processor 212 capable of performing operations according to various embodiments while configured accordingly.

In some example embodiments, the memory 214 can include one or more memory devices. Memory 214 can include fixed and/or removable memory devices. In some embodiments, the memory 214 can provide a non-transitory computer-readable storage medium that can store computer program instructions that can be executed by the processor 212. In this regard, the memory 214 can be configured to store information, data, applications, instructions and/or the like for enabling the apparatus 200 to carry out various functions in accordance with one or more example embodiments. In some embodiments, the memory 214 can be in communication with one or more of the processor 212, transceiver(s) 216, or SRVCC adaptation module 218 via a bus(es) for passing information among components of the apparatus 200.

The apparatus 200 can further include transceiver(s) 216. The transceiver(s) 216 can enable the apparatus 200 to send wireless signals to and receive signals from one or more wireless networks, such as the first network 106 and the legacy network 108. As such, the transceiver(s) 216 can be configured to support any type of RAT that may be implemented by the first network 106 and/or legacy network 108.

The apparatus 200 can further include SRVCC adaptation module 218. The SRVCC adaptation module 218 can be embodied as various means, such as circuitry, hardware, a computer program product comprising computer readable program instructions stored on a computer readable medium (for example, the memory 214) and executed by a processing device (for example, the processor 212), or some combination thereof. In some embodiments, the processor 212 (or the processing circuitry 210) can include, or otherwise control the SRVCC adaptation module 218.

When implemented on a device, such as Device A 102, performing an SRVCC handover, the SRVCC adaptation module 218 can be configured to determine a condition indicative of an impending SRVCC handover of Device A 102, and can provide an indication to a remote device, such as Device B 104, participating in a voice call. As such, the SRVCC adaptation module 218 can be configured to facilitate performance of operations illustrated in and described below with respect to FIG. 3.

When implemented on a device, such as Device B 104, that is participating in a voice call with a remote device, such as Device A 102, performing an SRVCC handover, the SRVCC adaptation module 218 can be configured to modify a configuration parameter of a de-jitter buffer in response to receiving an indication of the remote SRVCC handover in accordance with some example embodiments. As such, the SRVCC adaptation module 218 can be configured to facilitate performance of operations illustrated in and described below with respect to FIG. 4.

Figure 3:
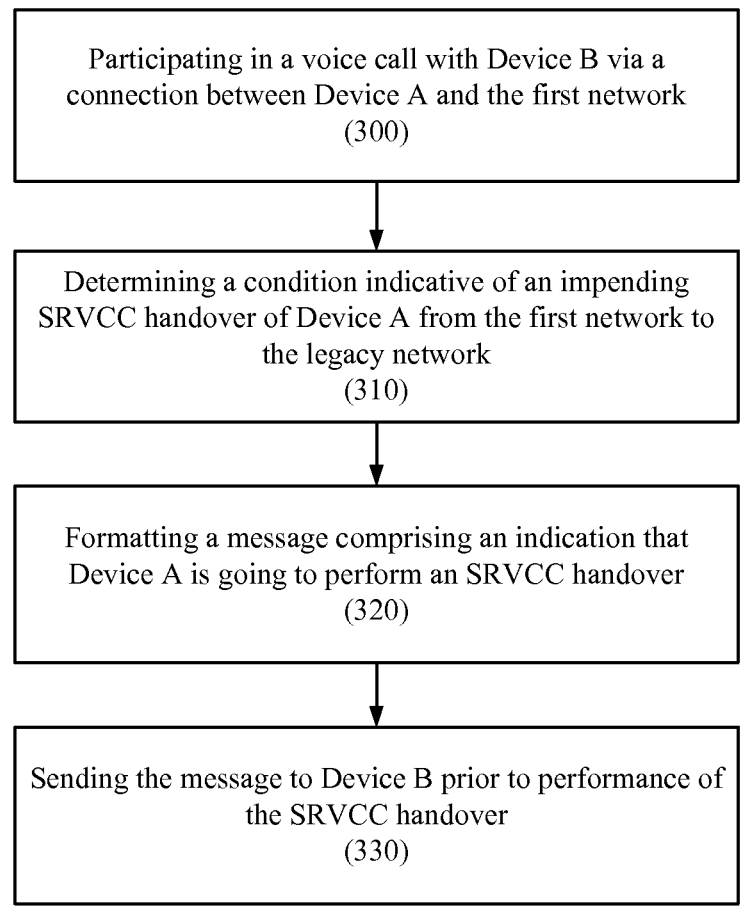
FIG. 3 illustrates a flowchart of an example method for providing an indication of an impending SRVCC handover in accordance with some example embodiments.

FIG. 3 illustrates a flowchart of an example method for providing an indication of an impending SRVCC handover in accordance with some example embodiments. In this regard, FIG. 3 illustrates operations that can be performed by Device A 102 to inform Device B 104 of an impending SRVCC handover in accordance with some example embodiments. One or more of processing circuitry 210, processor 212, memory 214, transceiver(s) 216, or SRVCC adaptation module 218 can, for example, provide means for performing one or more of the operations illustrated in and described with respect to FIG. 3.

Operation 300 can include Device A 102 participating in a voice call with Device B via a connection between Device A 102 and the first network 106. The voice call can be serviced on the Device A 102 end via a PS domain of the first network 106. For example, the voice call can be serviced as a VoIP call by the first network 106. In embodiments in which the first network 106 implements an LTE technology, the voice call can be serviced as a VoLTE call on the first network 106.

Operation 310 can include Device A 102 determining a condition indicative of an impending SRVCC handover of Device A 102 from the first network 106 to the legacy network 108. This determination can be made based at least in part on one or more measurements and/or other hints that can be available to Device A 102.

As one example, the determination of operation 310 can be made based at least in part on a measurement of the first network 106. For example, Device A 102 can determine that an observed signal quality (e.g., a downlink signal quality, such as a downlink signal power/strength) of the first network 106 is deteriorating and/or approaching a threshold for handover to another network. The observed signal quality can be expressed in terms of any measurement of signal quality that can be measured and/or otherwise derived by Device A 102, and can vary depending on a type of RAT implemented by the first network 106. By way of non-limiting example, the signal quality can comprise one or more of a reference signal received power (RSRP), reference signal received quality (RSRQ), received signal strength indicator (RSSI), channel quality indicator (CQI), signal-to-noise ratio (SNR), signal-to-interference plus noise ratio (SINR), and/or other signal quality measurement of the first network 106 that can be measured and/or otherwise derived by Device A 102.

In some example embodiments in which the determination of operation 310 can be made based at least in part on a measurement of the first network 106, Device A 102 can apply an advance SRVCC indication signal quality threshold that can be more conservative than a handover/reselection threshold such that Device A 102 can determine situations in which signal quality is deteriorating and approaching the handover/reselection threshold such that performance of an SRVCC handover is likely. Thus, for example, if the Device A 102 determines that the signal quality of the does not satisfy the advance SRVCC indication threshold, Device A 102 can determine that a condition indicative of an impending SRVCC handover exists.

The determination of operation 310 can additionally or alternatively be made based at least in part on an inter-RAT (iRAT) measurement of the legacy network 108. For example, Device A 102 can determine that a measured signal quality (e.g., a measured signal power/strength) for the legacy network 108 satisfies an iRAT handover threshold. The measured signal quality of the legacy network 108 can be expressed in terms of any measurement of signal quality that can be measured and/or otherwise derived by Device A 102, and can vary depending on a type of RAT implemented by the legacy network 108. By way of non-limiting example, the signal quality can comprise one or more of a received signal code power (RSCP), received energy per chip of the pilot channel divided by the total received power spectral density (Ec/No), RSSI, SNR, SINR, and/or other signal quality measurement of the legacy network 108 that can be measured and/or otherwise derived by Device A 102.

In some example embodiments, the determination of operation 310 can be made based at least in part on a combination of (e.g., a relationship between) a signal quality of the first network 106 and a signal quality of the legacy network 108. For example, in some embodiments, the determination of operation 310 can be based at least in part on a Radio Resource Control (RRC) event related to a relationship between the signal quality of the first network 106 and the signal quality of the legacy network 108, which can be indicative of an impending SRVCC handover.

The determination of operation 310 can additionally or alternatively be made based at least in part on a loading level on a serving base station, such as a serving evolved Node B (eNB), of the first network 106. In this regard, in some instances, Device A 102 can determine that a degree of loading of the serving base station indicates that Device A 102 is likely to be redirected to the legacy network 108. For example, in instances in which the loading level of the serving base station exceeds a threshold, Device A 102 can determine that an SRVCC handover to the legacy network 108 is likely.

As a further example, in some embodiments, the determination of operation 310 can be made in response to activation of Transmit Time Interval (TTI) bundling. In this regard, in some instances, the serving base station can activate TTI bundling on the uplink in response to deteriorating channel conditions, which can result in retransmissions of data on the uplink, such as in accordance with hybrid automatic repeat request (HARD) procedures. As such, activation of TTI bundling can be indicative that channel quality may continue to deteriorate and an SRVCC handover may be impending.

In some example embodiments, the determination of operation 310 can be made based at least in part on an error rate that can be observed by Device A 102 on the uplink and/or downlink. For example, if the Device A 102 determines that an error rate, such as a block error rate (BLER), frame error rate (FER), a HARQ retransmission count/frequency, and/or the like exceeds a threshold that can be indicative of declining channel quality approaching a handover threshold, Device A 102 can determine that an SRVCC handover is impending.

In response to the determination of operation 310, Device A 102 can perform operation 320 and 330 to provide Device B 104 with advance notice of the anticipated SRVCC handover to enable Device B 104 to prepare for the interruption in transfer of voice packets that can occur during the SRVCC handover, as described further below with respect to FIGS. 4 and 5.

Operation 320 can comprise Device A 102 formatting a message comprising an indication that Device A 102 is going to perform an SRVCC handover. The message can be formatted in accordance with any signaling that can be sent to Device B 104.

In some example embodiments, the message can be a dedicated signaling message that can be sent separately from voice packets for the voice call and which can be used to inform of an impending SRVCC handover.

Additionally or alternatively, in some example embodiments, the message can comprise a message that can be extended and/or repurposed to include a parameter indicating that Device A 102 is going to perform an SRVCC handover. For example, in some embodiments, an indication that Device A 102 is going to perform an SRVCC handover can be included in a voice packet comprising voice data for the voice call. In some such embodiments, the indication can be included in a header for the voice packet. For example, in embodiments in which voice data can be carried in real-time transport protocol (RTP) packets, the indication can be included in a payload header of an RTP packet, such as by way of non-limiting example, a reserved for future use field or the Codec Mode Request (CMR) field in an RTP payload header of an RTP packet that can be sent to Device B 104. Accordingly, in such embodiments, the indication of impending SRVCC handover can be injected in a stream of voice packets communicated for the voice call.

Operation 330 can include Device A 102 sending the message to Device B 104 prior to performance of the SRVCC handover. Device B 104 can, in turn, receive the message, and, in response to the indication included in the message, can modify a configuration parameter its local de-jitter buffer to prepare for the interruption in voice packet transfer that can occur during the remote SRVCC handover, as described further below with respect to FIG. 4.

Figure 4:
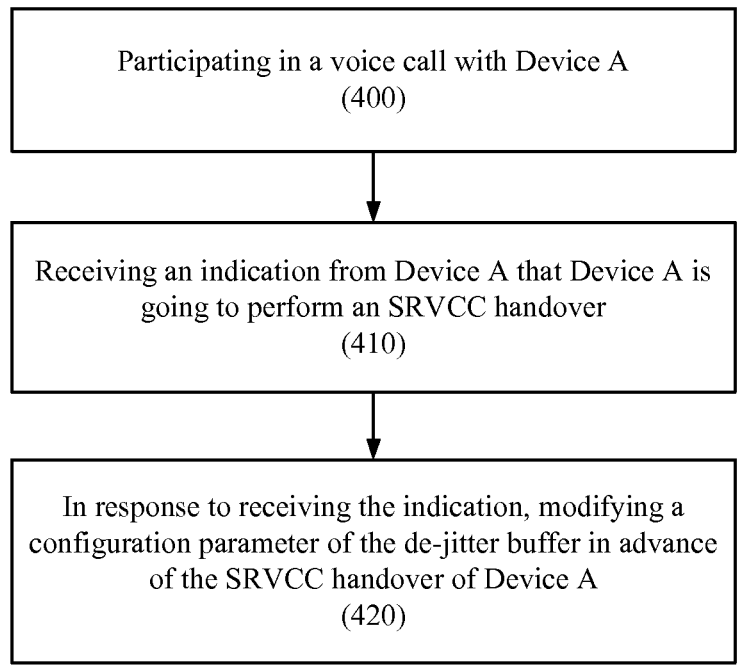
FIG. 4 illustrates a flowchart of another example method for preparing for a remote SRVCC handover in accordance with some example embodiments.

FIG. 4 illustrates a flowchart of another example method for preparing for a remote SRVCC handover in accordance with some example embodiments. In this regard, FIG. 4 illustrates operations that can be performed by Device B 104 to prepare for remote SRVCC handover of Device A 102 in accordance with some example embodiments. One or more of processing circuitry 210, processor 212, memory 214, transceiver(s) 216, or SRVCC adaptation module 218 can, for example, provide means for performing one or more of the operations illustrated in and described with respect to FIG. 4.

Operation 400 can include Device B 104 participating in a voice call with Device A 102. Operation 410 can include Device B 104 receiving an indication from Device A 102 that Device A 102 is going to perform an SRVCC handover. The indication received in operation 410 can, for example, be included in a message that can be formatted and sent by Device A 102 as described above with respect to operations 320 and 330.

Operation 420 can include Device B 104 modifying a configuration parameter of a de-jitter buffer (e.g., adjusting the de-jitter buffer) containing one or more buffered voice packets received from Device A 102 in advance of the remote SRVCC handover in response to the indication received in operation 410. In this regard, operation 420 can include modifying one or more de-jitter buffer configuration parameters to facilitate audio continuity during an interruption in the transfer of voice packets that can occur during the SRVCC handover.

For example, in some embodiments, operation 420 can comprise increasing a size of the de-jitter buffer so that additional voice packets are queued in advance of the SRVCC handover. In this regard, emptying of the de-jitter buffer during interruption of the transfer of voice packets that can occur during the SRVCC procedure can be avoided to avoid the audio discontinuity that could occur if the de-jitter buffer were emptied during the SRVCC handover.

Additionally or alternatively, in some embodiments, operation 420 can comprise Device B 104 modifying an amount of time warping applied to one or more voice packets queued in the de-jitter buffer. In this regard, audio samples collected prior to the remote SRVCC handover can be time warped to improve user perception of the gap in reception of packets that can occur during the SRVCC procedure. For example, a delay between provision of audio samples from the de-jitter buffer can be at least temporarily increased to avoid occurrence of a gap that can be noticeable by a user.

Figure 5:
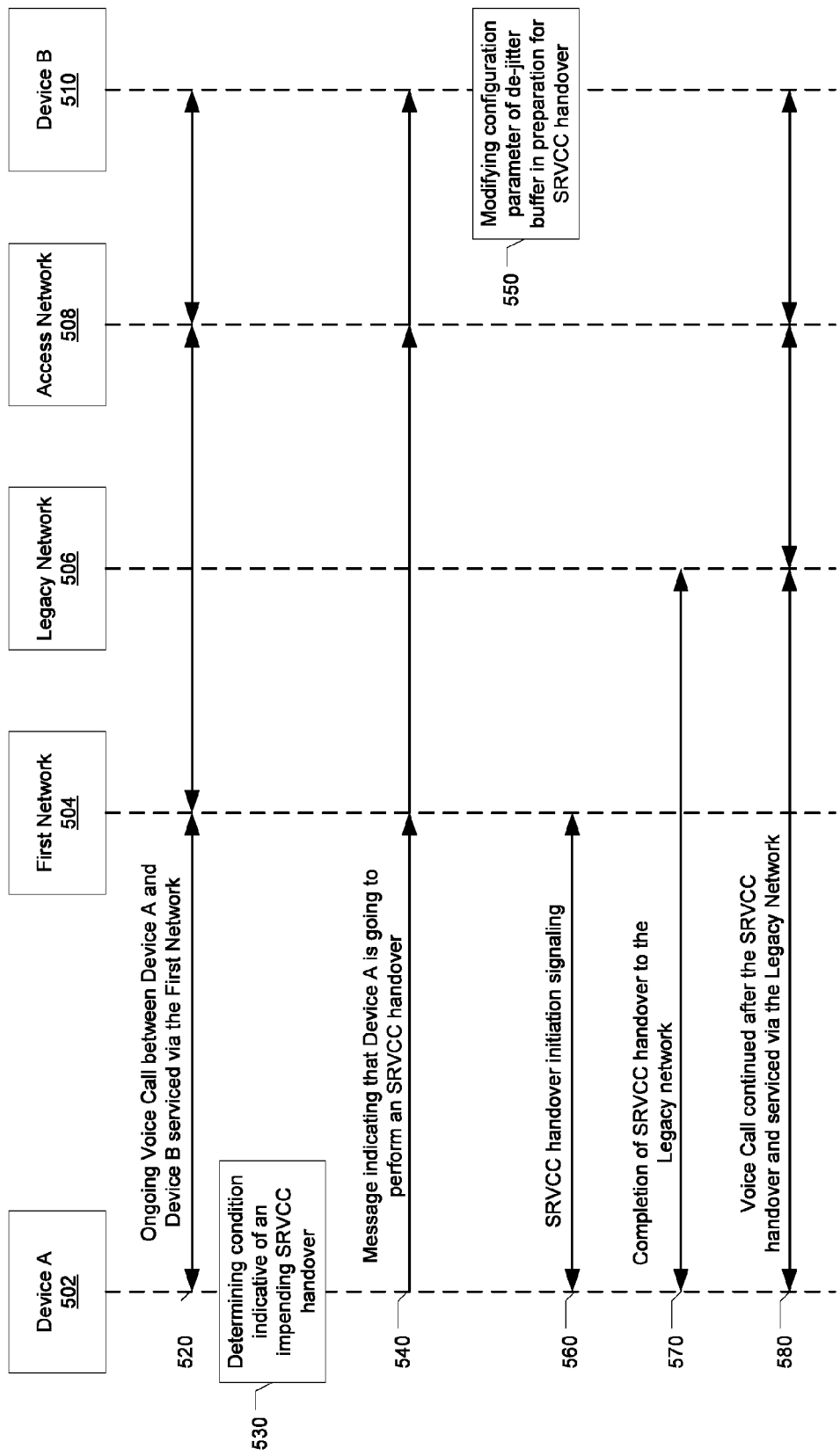
FIG. 5 illustrates a signaling diagram in accordance with some example embodiments.

FIG. 5 illustrates a signaling diagram in accordance with some example embodiments. In this regard, FIG. 5 illustrates signaling that can be exchanged and operations that can be performed within a system comprising Device A 502, first network 504, legacy network 506, access network 508, and Device B 510 in accordance with some example embodiments. Device A 502 and Device B 510 can, for example, comprise embodiments of Device A 102 and Device B 104, respectively. The first network 504 and legacy network 506 can, for example, correspond to embodiments of the first network 106 and legacy network 108, respectively. The access network 508 can comprise any access network (e.g., wireless or wireline) that can be used by Device B 510 to gain network access and engage in communication with Device A 502. Communication between the access network 508 and the cellular access networks (e.g., first network 504 and legacy network 506) that can be used by Device A 502 can be facilitated by one or more cellular core networks, one or more wireless networks, one or more wireline networks, or some combination thereof. In some example embodiments, the network 110 can enable communication between the access network 508 and cellular access networks that can be used by Device A 502. One or more of processing circuitry 210, processor 212, memory 214, transceiver(s) 216, or SRVCC adaptation module 218 can, for example, provide means for performing one or more of the operations attributed to Device A 502 and/or to Device B 510.

As illustrated in operation 520, Device A 502 and Device B 510 can have an ongoing voice call. The voice call can be serviced via the first network 504 as a PS voice call, such as a VoLTE call or other VoIP call.

Operation 530 can include Device A 502 determining a condition indicative of an impending SRVCC handover. In this regard, operation 530 can correspond to an embodiment of operation 310.

In response to the condition indicative of the impending SRVCC handover, Device A 502 can format and send a message indicating that Device A 502 is going to perform an SRVCC handover to Device B 540. The message that can be formatted and sent attendant to performance of operation 540 can, for example, comprise a message that can be formatted and sent in accordance with performance of operations 320-330, as described above.

Device B 510 can receive the message indicating that Device A 502 is going to perform an SRVCC handover and, in response, can prepare for the SRVCC handover by modifying a configuration parameter of its de-jitter buffer, as illustrated in operation 550. Operation 550 can, for example, correspond to an embodiment of operation 420, as described above.

Operation 560 can include Device A 502 and first network 504 exchanging handover initiation signaling. The handover initiation signaling can, for example, include a measurement report that can be sent by Device A 502 and/or a redirection message that can be sent by first network 504. The first network 504 can coordinate handover of the voice call to the legacy network 506, such as with the assistance of one or more core network elements that can be used to interface the first network 504 and legacy network 506. Attendant to performance of the SRVCC handover, Device A 502 can establish a connection with the legacy network 506 and can complete the SRVCC handover, at operation 570.

After completion of the SRVCC handover, the voice call between Device A 502 and Device B 510 can continue via the legacy network 506, as illustrated by operation 580. The voice call can be serviced as a CS voice call via a CS domain of the legacy network 506 after the SRVCC handover.

The various aspects, embodiments, implementations or features of the described embodiments can be used separately or in any combination. Various aspects of the described embodiments can be implemented by software, hardware or a combination of hardware and software. The described embodiments can also be embodied as a computer readable medium (or mediums) storing computer readable code including instructions that can be performed by one or more computing devices. The computer readable medium may be associated with any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code may be stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments. For example, it will be appreciated that the ordering of operations illustrated in the flowcharts is non-limiting, such that the ordering of two or more operations illustrated in and described with respect to a flowchart can be changed in accordance with some example embodiments. As another example, it will be appreciated that in some embodiments, one or more operations illustrated in and described with respect to a flowchart can be optional, and can be omitted.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A method for providing indication of a single radio voice call continuity (SRVCC) handover, the method comprising a first wireless communication device:
    participating in a voice call with a second wireless communication device via a connection between the first wireless communication device and a first network servicing the voice call as a voice over Internet protocol (VoIP) call via a packet switched domain;
    determining a condition indicative of an impending SRVCC handover of the first wireless communication device from the first network to a legacy network, wherein the legacy network comprises a circuit switched domain configured to service the voice call as a circuit switched call after completion of the SRVCC handover; and
    in response to the condition:
        formatting a message comprising an advance indication that the first wireless communication device is going to perform the SRVCC handover; and
        sending the message to the second wireless communication device prior to performance of an SRVCC procedure that includes the SRVCC handover in conjunction with the first network and the legacy network,
    wherein the condition is based on signal quality parameters and/or loading level parameters.

2. The method of claim 1, wherein the message comprises a voice packet comprising voice data for the voice call and the advance indication.

3. The method of claim 2, wherein the voice packet comprises a real-time transport protocol (RTP) packet, and wherein the advance indication is included in a payload header of the RTP packet.

4. The method of claim 1, wherein the message comprises a dedicated signaling message that is sent separately from voice packets comprising voice data for the voice call.

5. The method of claim 1, wherein determining the condition comprises determining the condition based at least in part on a deterioration in signal quality of the first network.

6. The method of claim 1, wherein determining the condition comprises determining the condition based at least in part on a measured signal quality of the legacy network.

7. The method of claim 1, wherein determining the condition comprises determining the condition based at least in part on a loading level on a serving base station of the first network.

8. The method of claim 1, wherein determining the condition comprises determining that Transmit Time Interval (TTI) bundling has been activated.

9. The method of claim 1, wherein the first network comprises a network implementing a Long Term Evolution (LTE) technology, and wherein the voice call is serviced as a Voice over LTE (VoLTE) call on the first network.

10. A wireless communication device comprising:
    at least one transceiver, the at least one transceiver configured to send wireless signals to and receive wireless signals from a first network and a legacy network; and processing circuitry coupled with the at least one transceiver, wherein the processing circuitry is configured to cause the wireless communication device to at least:

participate in a voice call with a second wireless communication device via a connection between the wireless communication device and the first network;

determine a condition indicative of an impending SRVCC handover of the wireless communication device from the first network to the legacy network; and in response to the condition:
  format a message comprising an advance indication that the wireless communication device is going to perform the SRVCC handover; and
  send the message to the second wireless communication device prior to performance of an SRVCC procedure that includes the SRVCC handover in conjunction with the first network and the legacy network.

11. The wireless communication device of claim 10, wherein the message comprises a voice packet comprising voice data for the voice call and the advance indication.

12. The wireless communication device of claim 10, wherein the processing circuitry is further configured to cause the wireless communication device to determine the condition based at least in part on one or more of a deterioration in signal quality of the first network or a measured signal quality of the legacy network.

13. The wireless communication device of claim 10, wherein the processing circuitry is further configured to cause the wireless communication device to determine the condition based at least in part on a loading level on a serving base station of the first network.

14. The wireless communication device of claim 10, wherein the processing circuitry is further configured to cause the wireless communication device to determine the condition in response to activation of Transmit Time Interval (TTI) bundling.

15. A method for preparing for a remote single radio voice call continuity (SRVCC) handover, the method comprising a first wireless communication device:

participating in a voice call with a second wireless communication device;

receiving an advance indication from the second wireless communication device that the second wireless communication device is going to perform an SRVCC procedure that includes an SRVCC handover; and in response to receiving the advance indication, modifying a configuration parameter of a de-jitter buffer of the first wireless communication device, the de-jitter buffer containing at least one voice packet received for the voice call in advance of the SRVCC handover of the second wireless communication device.

16. The method of claim 15, wherein receiving the advance indication comprises receiving a voice packet comprising voice data for the voice call and the advance indication.

17. The method of claim 16, wherein the voice packet comprises a real-time transport protocol (RTP) packet, and wherein the advance indication is included in a payload header of the RTP packet.

18. The method of claim 15, wherein receiving the advance indication comprises receiving an advance indication included in a dedicated signaling message sent separately from voice packets comprising voice data for the voice call.

19. The method of claim 15, wherein modifying the configuration parameter of the de-jitter buffer comprises increasing a size of the de-jitter buffer.

20. The method of claim 15, wherein modifying the configuration parameter of the de-jitter buffer comprises modifying an amount of time warping applied to one or more voice packets queued in the de-jitter buffer.

* * * * *